(12) United States Patent
Perkins et al.

(10) Patent No.: US 6,853,445 B2
(45) Date of Patent: Feb. 8, 2005

(54) TWO-DIMENSIONAL ANGLE OF ARRIVAL DETECTION DEVICE

(75) Inventors: Matthew R. Perkins, Sunrise, FL (US); Tzer-Hso Lin, Sunrise, FL (US); Neal K. Patwari, Ann Arbor, MI (US)

(73) Assignee: Motorola, Inc., Schaumburg, IL (US)

( * ) Notice: Subject to any disclaimer, the term of this patent is extended or adjusted under 35 U.S.C. 154(b) by 376 days.

(21) Appl. No.: 10/041,052

(22) Filed: Jan. 7, 2002

(65) Prior Publication Data

US 2003/0128355 A1 Jul. 10, 2003

(51) Int. Cl.[7] .................................................. G01J 1/00
(52) U.S. Cl. ...................................................... 356/121
(58) Field of Search ................................ 356/121–122, 356/614–624, 1, 3.1, 3.12, 141.1, 152, 400, 4, 45, 373, 376; 235/467; 324/449; 250/561, 231.1, 231.11

(56) References Cited

U.S. PATENT DOCUMENTS

| 4,330,204 A | * | 5/1982 | Dye ...................... 356/139.05 |
| 5,137,354 A | * | 8/1992 | deVos et al. .............. 356/141.3 |
| 5,715,042 A | * | 2/1998 | Milani et al. .............. 356/3.12 |
| 5,784,506 A |   | 7/1998 | Pfeiffer |
| 5,867,290 A |   | 2/1999 | Dutt et al. |
| 5,920,394 A | * | 7/1999 | Gelbart et al. .............. 356/615 |
| 6,025,944 A |   | 2/2000 | Mendez et al. |
| 6,069,700 A | * | 5/2000 | Rudnick et al. ............. 356/511 |
| 6,400,452 B1 | * | 6/2002 | Maynard .................. 356/141.1 |

FOREIGN PATENT DOCUMENTS

| WO | WO 0007317 | 2/2000 |
| WO | WO 0007319 | 3/2000 |

* cited by examiner

Primary Examiner—Michael P. Stafira

(57) ABSTRACT

A device for detecting the direction of a light source. The device has a pin-hole lens that allows a collimated light beam to excite a light sensing surface behind the lens. The output from the light sensing surface is passed to a processor that determines the position of the surface that has been excited and the direction of the light source. When the position of one or more light sources is known, the device may further determine its own position. The devices may be used in a location system to provide known reference points to a network of other devices. The light sources may be modulated, in which the device can select or identify a particular light source based upon its modulation pattern.

44 Claims, 5 Drawing Sheets

US 6,853,445 B2

TWO-DIMENSIONAL ANGLE OF ARRIVAL DETECTION DEVICE

TECHNICAL FIELD

This invention relates to techniques and apparatus for detecting the two-dimensional angle of arrival or direction of an optical source. This invention is especially suitable for use in a location estimation system utilizing optical transmitters.

BACKGROUND OF THE INVENTION

Outdoor location or positioning systems, such as RADAR, GPS and LORAN, have been used for many years to locate people or objects. These techniques generally make use of radio frequency (RF) signals from a transmitter. Various properties of the RF signal can be measured to determine location; these include Receive Signal Strength (RSS), Time Difference of Arrival (TDoA) and Angle of Arrival (AoA). However, the techniques have limited accuracy and often require expensive supporting infrastructure. Moreover, they cannot be used effectively inside buildings because the RF transmission signals undergo fading, dispersion and reflection. Reflections cause the signal to arrive at a detector from multiple paths and create multipath interference. However, techniques and apparatus for accurate positioning of people and objects within buildings are required for applications such as personal security and asset management systems.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1A:
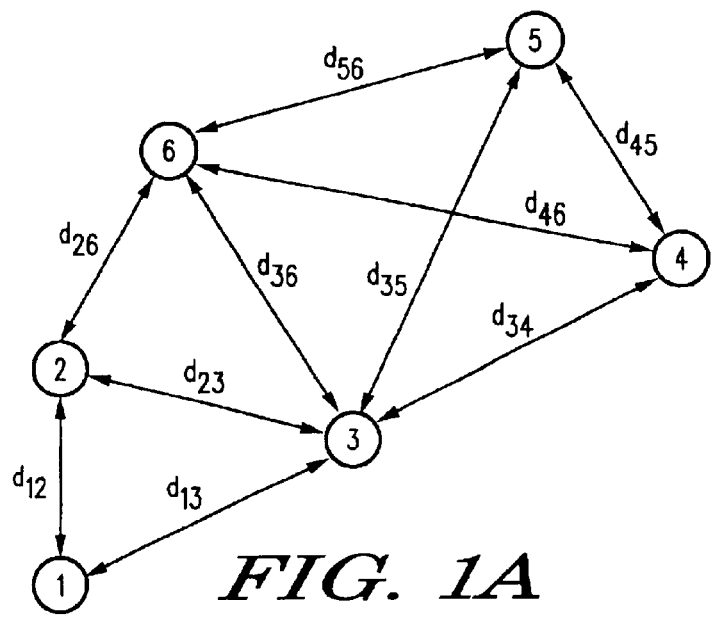
FIG. 1A is a diagrammatic representation of a network of devices with relative position knowledge.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The present invention relates to device that can determine a two-dimensional angle of arrival of light falling upon the device. By determining the angles for light incident from a number of sources, the device can determine its own position relative to the sources. In addition, if the locations of the sources are known, the device can determine its own absolute position.

An example use of the device is in concert with an optical communications infrastructure in a building. The device can determine its own position relative to the infrastructure and provide a reference point for other in-building location devices. In many cases an optical infrastructure will consist of previously installed, in-building lights. Such lights might include incandescent bulbs, fluorescent lamps and halogens, LED's or laser diodes. Other in-building location devices, which will be referred to as "blind devices", typically consist of a sensor, an RF transceiver and a processor that can perform position estimates based upon signal strength or some other ranging technology. The device of the present invention may be used to enhance such an infrastructure by providing an absolute position reference to the location map created by the blind devices.

Blind devices include sensors for detecting temperature changes, chemical irregularities, moisture or even dangerous situations. In order to make use of the information gathered by the sensor, the device must communicate with its neighbors and determine the distance from all or some of its nearest neighbors. By doing this, the estimated location of the event can be determined and recorded and the appropriate actions taken. Once every blind device has recorded the position of the surrounding devices, the position of each device relative to the network is known. This can be calculated by each device or by a central processor that communicates with the devices. That is to say, a map can be created that shows the location of every device relative to neighboring devices, but the map does not have a reference point.

Figure 1B:
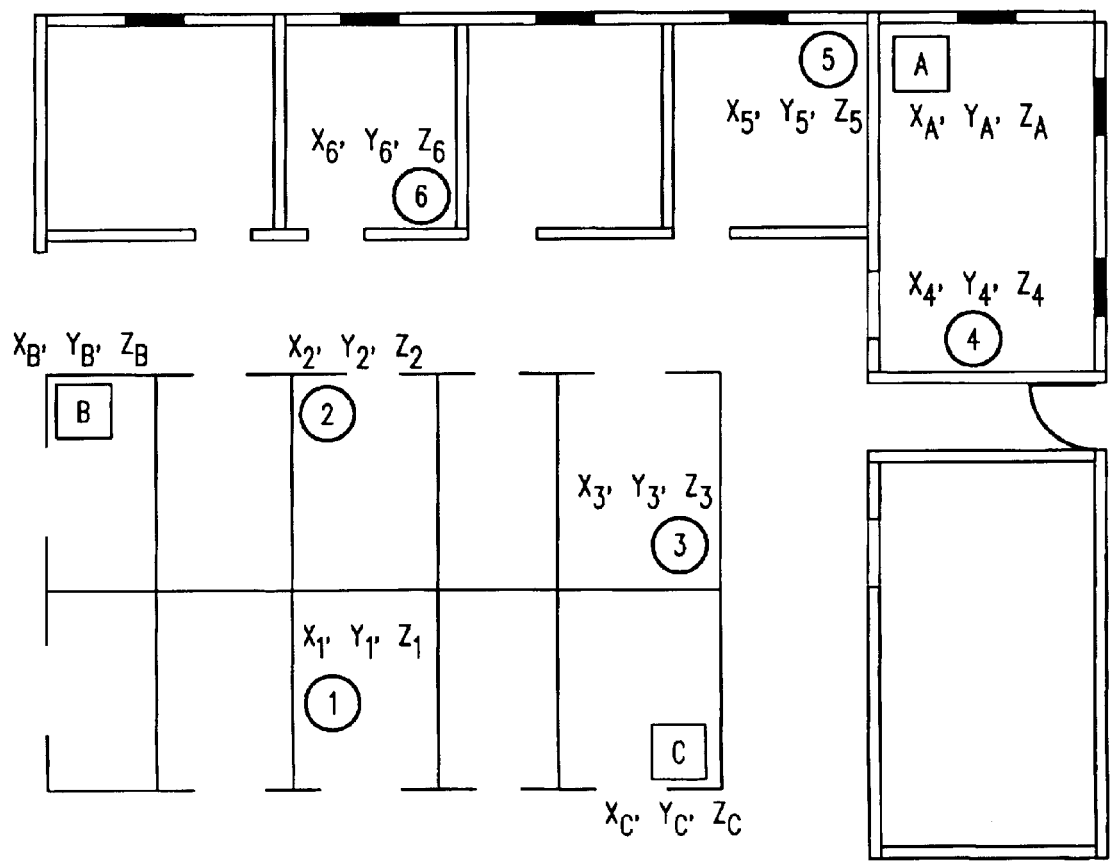
FIG. 1B is a diagrammatic representation of a network of devices combined with reference detection devices of the present invention.

FIG. 1A, shows a map of devices, labeled 1–6, in a office building. The device can typically detect the distances $d_{ij}$ to other devices, and thereby determine their position relative to the other devices. However, the absolute positions of the devices within an office building are unknown unless, as shown in FIG. 1B, a number of reference devices are added to the network. FIG. 1B shows a plan view of the location of the same network of devices with respect to the fixed structure of an office building. The reference devices, shown as squares labeled A, B and C in the figure, allow all of the other devices to determine their absolute positions $(x_i, y_i, z_i)$, as shown in FIG. 1B. This is possible because the reference devices, A, B and C, are able to determine their absolute positions $(x_A, y_A, z_A)$ etc., with respect to the fixed infrastructure of the office building.

An important feature of the present invention is the ability of the device to be placed in an environment and determine its absolute position without the need for manual configuration. This ability reduces the cost of setting up a location infrastructure. Previously, reference devices would have to be configured manually or have their positions recorded.

Figure 2:
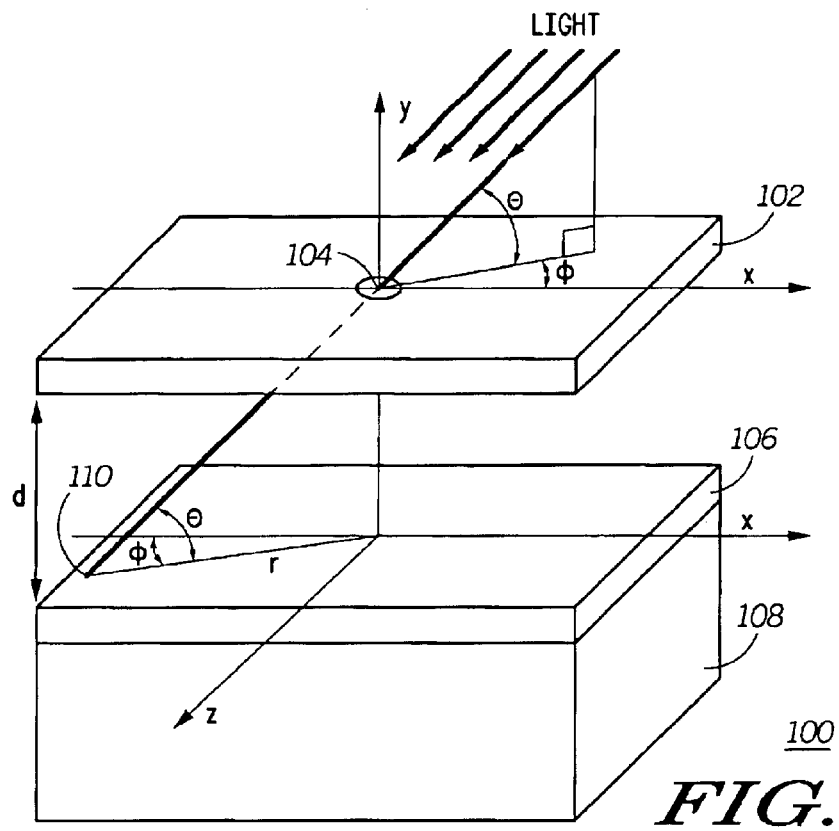
FIG. 2 is a diagrammatic representation of a two-dimensional angle of arrival detection device of the present invention.

A diagrammatic representation of the detection device of the present invention is shown in FIG. 2. Referring to FIG.

2, the detection device 100 includes a pin-hole lens 102 with effective aperture 104, a light sensing surface 106, such as a CCD array, and a processor 108. In the preferred embodiment, the output from the light sensor 106 is sampled by an analog-to-digital converter (ADC) (not shown) and the resulting digital signal is passed to the processor 108. The plane of the pin-hole lens and light sensor is designated as the x-z plane. The y-axis is perpendicular to the x-z plane, as shown in the figure. The distance between the pin-hole lens 102 and the light sensing surface 106 is denoted by d. Light incident on the pin-hole lens 102 at an angle $\theta$ to the plane of the lens and an angle $\phi$ to an x-axis in the plane of the lens produces a collimated beam that excites the light sensing surface 106 at a position 110 a distance r from the y-axis. The position 110 is denoted by cylindrical coordinates (r, $\phi$) or by Cartesian coordinates ($x_1$, $z_1$), these are related by $r=\sqrt{x_1^2+z_1^2}$ and $$\phi = \arctan\left(\frac{-x_1}{z_1}\right).$$

In operation, the coordinates ($x_1$, $z_1$) are measured from which the distance r and the angle $\phi$ can be calculated. In addition, since the distance d between the light sensing surface and the pin-hole lens is known, the angle $\theta$ can be calculated as $$\theta = \arctan\left(\frac{d}{r}\right) = \arctan\left(\frac{d}{\sqrt{x_1^2+z_1^2}}\right).$$

The functions $$\phi(x_1, z_1) = \arctan\left(\frac{-x_1}{z_1}\right) \text{ and } \theta(x_1, z_1) = \arctan\left(\frac{d}{\sqrt{x_1^2+z_1^2}}\right)$$

can be tabulated in a look-up table in the processor or calculated as required. The detection device is thus able to determine the direction ($\theta$, $\phi$) of the light incident upon the device.

The direction can also be determined as a vector direction. For example if we denote the location of the pin-hole as x=(x, y, z) and the location of the reference light source as xi=($x_i$, $y_i$, $z_i$), the direction is defined by the unit vector $$n_i = \frac{x_i - x}{|x_i - x|}.$$

Light incident from a direction close to the y-direction will fall close to center of the light sensing surface. Light incident at increasing angles to the y-direction will fall further from the center of the sensing surface. In the preferred embodiment, the distance d is small relative to the size of the light sensing surface, so that a wide range of angles $\theta$ can be measured.

In a further embodiment, the light sensing surface 106 is concave or curved in a bowl shape, so that a greater range of angles $\theta$ can be measured. The light sensing surface could also be convex.

In the preferred embodiment, the light sensing surface is divided into a matrix of individual photo-detector elements. Each element is mapped to a particular pair of angles ($\theta$, $\phi$). Thus, if a particular element is excited by a column of light, it is known that the light came from a direction with angles ($\theta$, $\phi$).

Figure 3:
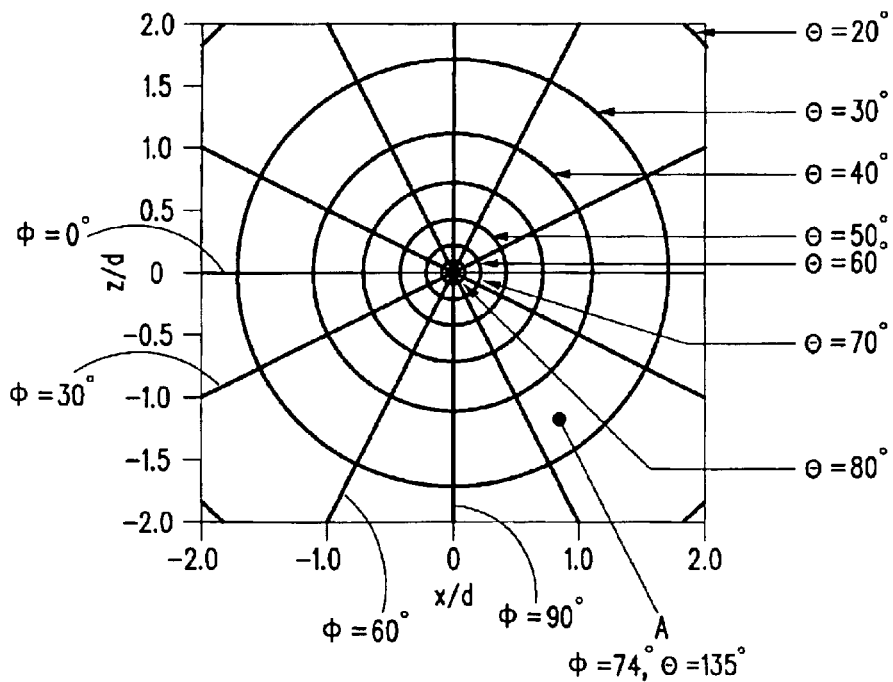
FIG. 3 is a diagrammatic representation of mapping between positions on a light sensing surface and a two-dimensional angle of arrival according to an embodiment of the present invention.

FIG. 3 shows an example of how the angles $\theta$ and $\phi$ map onto the surface of the light sensing surface. The concentric circles depict lines of constant $\theta$, while the radial lines depict lines of constant $\phi$. In this example, the surface is flat and square with sides of length 4d; i.e. four times the separation between the light sensing surface and the pin-hole lens. In this example, if light falls on the point labeled 'A' in FIG. 3, then the light is determined to have been incident from the direction $\theta$=74°, $\phi$=135°.

In a further embodiment the lens is a hologram that receives light from a light source and projects it onto the light sensing surface. The position of projected image may be used to determine the direction of the incident light.

Figure 4:
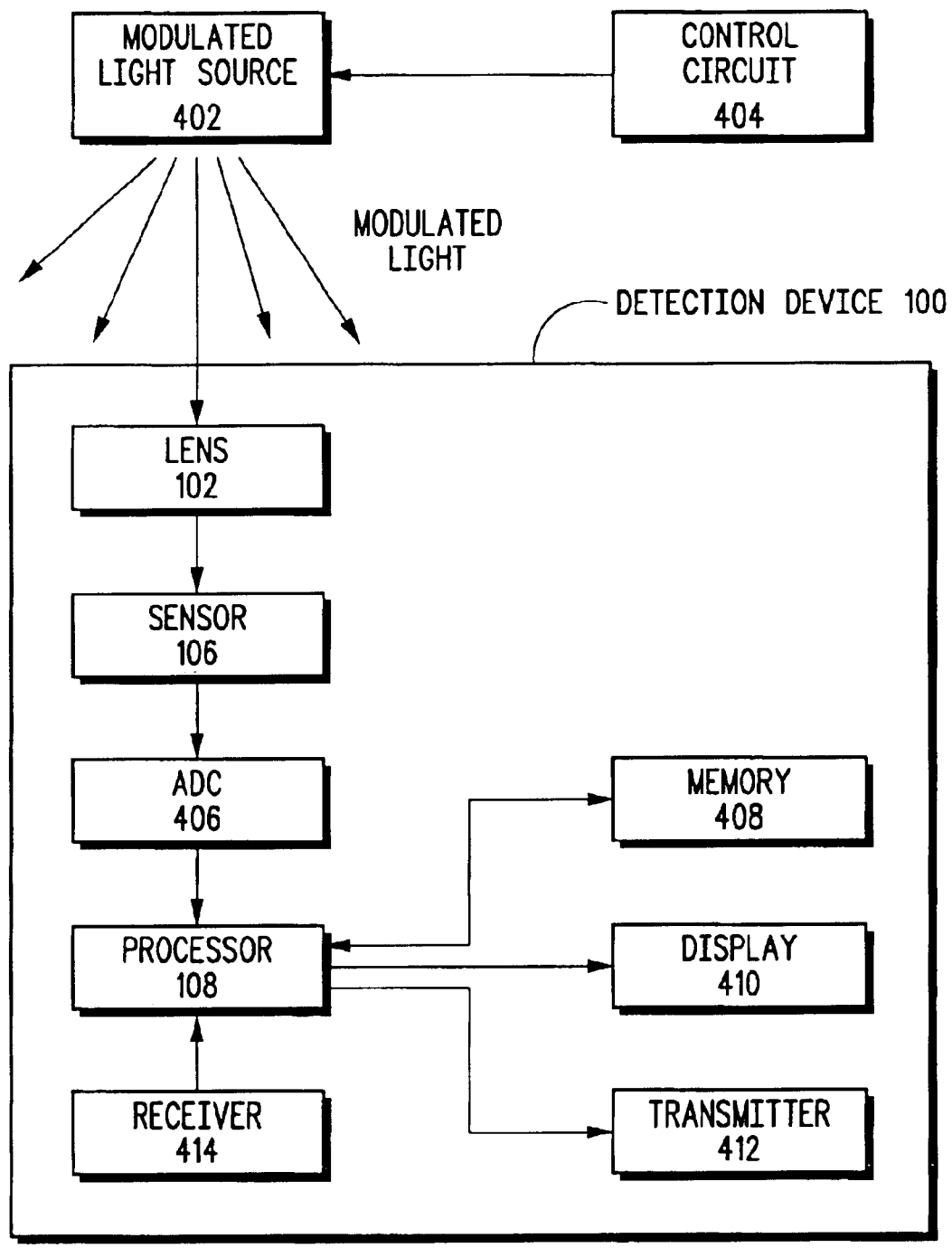
FIG. 4 is a diagrammatic representation of location system incorporating a detection device of the present invention.

FIG. 4 is a diagram showing an exemplary system incorporating a detection device 100 of the invention. In this example, a modulated light source 402 is controlled by control circuit 404. The control circuit controls aspects of the light source, such as the modulation, intensity and operation period. Some of the modulated light produced by the modulated light source 402 is received by the lens 102 of the detection device 100. The light then falls on light sensing surface 106 that in turn produces a signal that is sampled by analog-to digital converter (ADC) 406. The resulting digital signal is passed to processor 108. The processor detects the coordinates on the light sensing surface that has the greatest illumination and maps those coordinates to angles $\theta$ and $\phi$, using a look-up table for example. The light source is identified by the characteristics of the signal. For example, the spectrum, modulation pattern, or time of arrival could be used to determine which of a number of light sources has produced the light. Once the light source has been identified, it's known location can be retrieved from memory 408. Additionally, the intensity of the light can be determined. If this is compared with the known intensity of the source, the distance from the light source to the detector may be calculated by the processor. The process may be repeated for a number of different light sources. Once the angle to a number of light sources has been determined, the processor can determine its absolute location.

Information in addition to the directions to the light sources may be used to determine the location of the device. For example, the height or orientation of the light sensing surface may be known in advance. In some applications, the height of the detection device may be known. In this case two or more light sources may be used to determine the position of the device.

In addition to a pin-hole lens, light sensing surface and processor, the device may have a display for displaying the location of the device to a user, a memory for storing location information or one or more transmitters for transmitting the location of the device to other devices, such as blind devices. The transmitters may use optical, radio, ultrasonic, infra-red or other transmission media.

The device may also include one or more receivers to receive communication signals from other devices.

The device may include one or more transmitters to transmit communication signals from other devices or to a central processor. In the latter case, the position of the projected image may be transmitted to the central processor, and the calculation of the direction of the light source or the position of the detection device may be performed by the central processor.

The device may include a mirror or prism or other optical element in the optical path between the lens and the light sensing surface: the optical element serving to direct the light from the lens to the light sensing surface.

The device may be incorporated in other devices such as telephones, Personal Digital Assistants (PDAs), computers or any device that needs to be tracked or located.

The optical properties of the pin-hole lens and the light sensing surface may be selected to be more responsive to light with a predetermined spectrum, thereby making the device less sensitive to other light sources that might otherwise cause interference and reduce the accuracy of the device. In particular, the light sensing surface may contain plurality of elements, responsive to different optical spectra. The processor may operate to select those elements responsive to the spectrum of a particular light source, thereby excluding the response of other light sources. In this way the device may select between light sources that are simultaneously active.

A further method for selecting between or identifying light sources is the use of modulation. If each light source is modulated with a different modulation signal, the processor can correlate or demodulate the signal from the light sensing surface with a selected demodulation signal. Again, this allows the device to select between different light sources. Selection is important when the directions to multiple light sources must be measured to determine the location of the device.

A still further method for selecting between or identifying light sources is the use of time division multiplexing. According to this method, each light source is active for a specified period or at a specified time. Synchronization may be used to time-align the system.

The processor may perform matched filtering, enabling the device to respond to light with a predetermined modulation pattern; thereby making the device less sensitive to other light sources that might otherwise cause interference and reduce the accuracy of the device.

Figure 5:
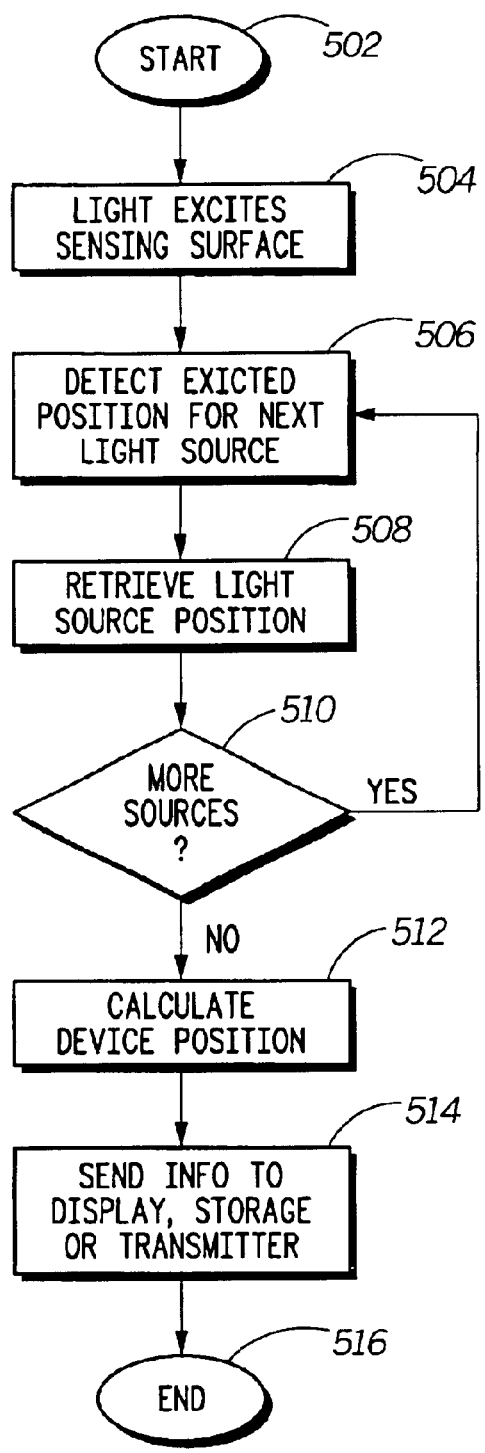
FIG. 5 is a flow chart of an embodiment of the location technique of the present invention.

A flow chart depicting the method of the invention is shown in FIG. 5. Following start block 502, light from one or more light sources excites the light sensing surface at block 504. The resulting signals are sampled by an ADC and passed to the processor. The processor detects light from a particular source, by the appropriate demodulation for example, at block 506 and then retrieves the location of the light source from memory at block 508. At decision block 510 a check is made to determine if more light sources are to be detected. This will be the case when a single source direction is not sufficient to determine the location of the device. However, if the distance to the source and the orientation of the detector are known, a single source may be sufficient. If more light sources are to be detected, as depicted by the positive branch from decision block 510, flow returns to block 506. If no more light sources are to be detected, as depicted by the negative branch from decision block 510, flow continues to block 512, and the position of the device is calculated from the measured directions to each light source and any additional information (such as the orientation of the device, the height of the device or the distance from the device to the light source). Alternatively, the position of the projected image can be transmitted to a remote processor where the calculations are performed. At block 514, the location of the device may be displayed, on a screen for example, stored in memory or transmitted to other devices. The process terminates at block 516. The process may be repeated at predetermined intervals or whenever the device has been relocated.

Figure 6:
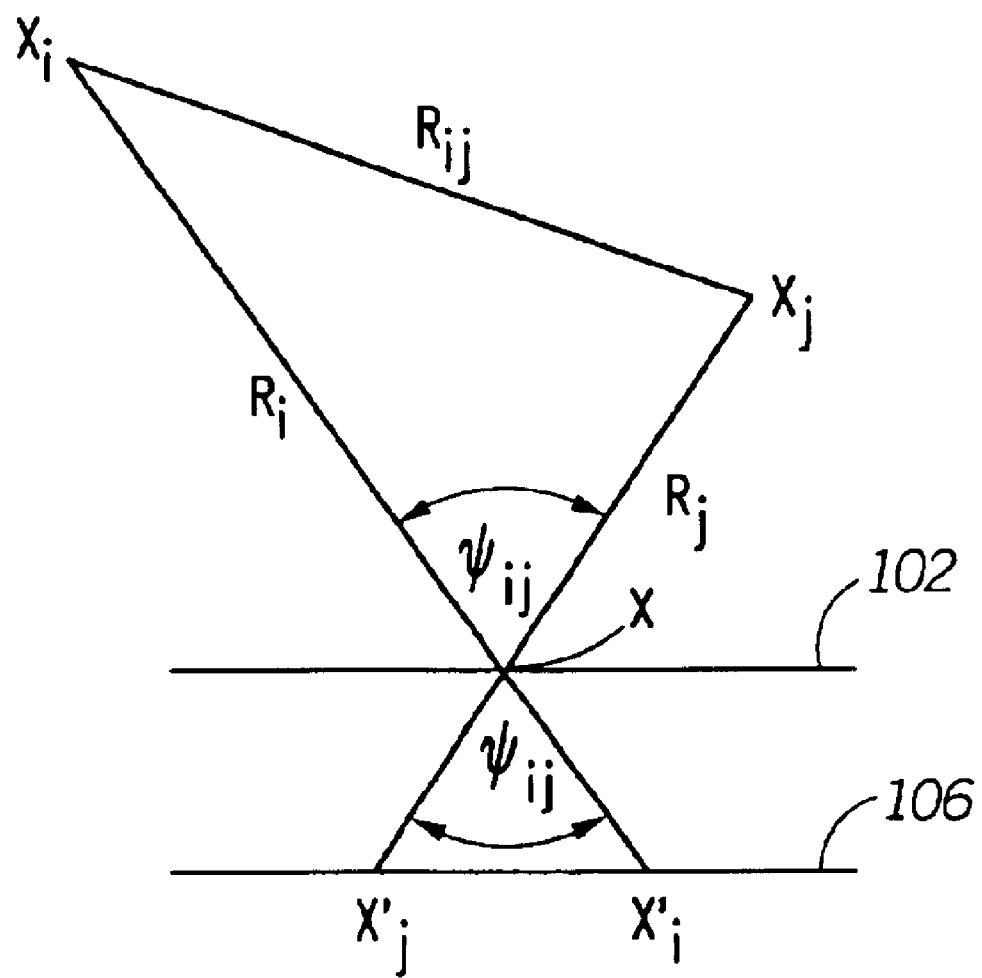
FIG. 6 is a diagram showing a geometry for location calculation in accordance with the invention.

When the orientation of the detection device is unknown, as for example when the device is integrated with a cellular telephone, the positions of the images of three light sources on the light sensing surface may be measured and used to determine the location of the device. One method for making this determination will now be described. FIG. 6 shows two light source positions $x_i$ and $x_j$. The light passes through lens 102 and is projected onto light sensing surface 106 to form images at positions $x'_i$ and $x'_j$. We denote the location of the pin-hole as $x=(x, y, z)$ and the locations of the reference light sources as $x_i=(x_i, y_i, z_i)$. Using this notation, we can write the unknown distances from the light source i to the pin-hole as $$r_i=|x_i-x|=[(x_i-x)^2+(y_i-y)^2+(z_i-z)^2]^{1/2},$$

and the known distance between light source i and light source j as $r_{ij}=|x_i-x_j|$. These distances are related by $$r_{ij}^2=r_i^2+r_j^2-2r_ir_j\cos(\psi_{ij}),$$

where $\psi_{ij}$ is the angle between the directions to source i and source j. The angles $\psi_{ij}$ can be calculated from the image positions $x'_i$ and $x'_j$ and the known distance from the leans to the light sensing surface. The orientation of the device is not required. Writing $c_{ij}=\cos(\psi_{ij})$, we can use three light sources to get the equations $$r_{12}^2=r_1^2+r_2^2-r_1r_2c_{12}$$

$$r_{13}^2=r_1^2+r_3^2-r_1r_2c_{13}$$

$$r_{23}^2=r_2^2+r_3^2-r_2r_3c_{23}$$

These equations can be solved to give a quartic equation for $r_1$. Once $r_1$ is known, $r_3$ and $r_3$ can be found. Alternatively, the equations can be solved directly for $x=(x, y, z)$. We introduce the errors defined by the equations, $$e_{12}(\hat{x},\hat{y},\hat{z})=r_1^2+r_2^2-r_1r_2c_{12}-r_2^2$$

$$e_{13}(\hat{x},\hat{y},\hat{z})=r_1^2+r_3^2-r_1r_3c_{13}-r_{13}^2$$

$$e_{23}(\hat{x},\hat{y},\hat{z})=r_2^2+r_3^2-r_2r_3c_{23}-r_{23}^2$$

where $(\hat{x},\hat{y},\hat{z})$ is an estimate of $(x,y,z)$. The equations can be solved by minimizing the cost function $$J(\hat{x},\hat{y},\hat{z})=e_{12}^2(\hat{x},\hat{y},\hat{z})+e_{13}^2(\hat{x},\hat{y},\hat{z})+e_{23}^2(\hat{x},\hat{y},\hat{z})$$

with respect to the position estimate $(\hat{x},\hat{y},\hat{z})$ using a standard search algorithm. The calculation may be performed on the processor of the device, or the positions of the images on the light sensing surfaces may be transmitted to a central processor where the calculations are performed.

Those of ordinary skill in the art will recognize that the present invention has been described in terms of exemplary embodiments based upon a detection device including a pin-hole lens, a light sensing surface and a processor. However, the invention should not be so limited, since the present invention could be implemented using equivalent hardware components those described above and claimed below.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A device for determining a location based on a modulated light source, the device comprising:

a lens for receiving modulated light from the light source and projecting a light pattern;

a light sensing surface for receiving the light pattern from the lens and producing an output signal in response thereto; and a processor operable to determine an identification of the modulated light source and to determine the location based on the output signal and the identification of the modulated light source.

2. A device in accordance with claim 1, wherein the processor determines identification of the modulated light source based on a demodulation of the modulated light source.

3. A device in accordance with claim 1, wherein the lens is a holographic lens.

4. A device in accordance with claim 1, wherein the light sensing surface comprises a plurality of light sensing element.

5. A device in accordance with claim 4, wherein the plurality of light sensing elements include elements sensitive to light in a plurality of spectra.

6. A device in accordance with claim 1, wherein the light sensing surface comprises a CCD array.

7. A device in accordance with claim 1, wherein the light sensing surface comprises a photo-diode array.

8. A device in accordance with claim 1, further comprising an analog-to-digital converter coupled to the light sensing array and the processor, and operable to convert the output signal into a digital output signal and provide the digital output signal to the processor.

9. A device in accordance with claim 1, further comprising a display coupled to the processor.

10. A device in accordance with claim 1, further comprising a memory coupled to the processor.

11. A device in accordance with claim 1, further comprising a communication transmitter coupled to the processor.

12. A device in accordance with claim 1, further comprising a communication receiver coupled to the processor.

13. A device in accordance with claim 1, wherein the processor includes a demodulator used to demodulate the modulated light source.

14. A device in accordance with claim 1, wherein the light sensing surface is flat.

15. A device in accordance with claim 1, wherein the light sensing surface is concave.

16. A method for determining a location based on a plurality of light sources, the method comprising the steps of:

simultaneously receiving light from the plurality of light sources;

projecting the light through a pinhole lens onto a light sensing surface to produce a pattern of light on the light sensing surface; and determining the location based on the pattern of light on the light sensing surface.

17. A method as in claim 16, wherein the location is additionally based on an intensity of the light received from the plurality of light sources.

18. A method for determining the position of a device the method comprising:

receiving light from a light source;

projecting the light onto a light sensing surface to form a projected image;

receiving a signal from the light sensing surface, the signal being indicative of the position of the projected image on the light sensing surface;

retrieving stored information from a memory;

determining the position of the device from the signal and the stored information; and transmitting the position of the device to other devices in a network of devices.

19. A method in accordance with claim 18, wherein the stored information includes the location of the light source.

20. A method in accordance with claim 18, wherein the stored information includes the vertical position of the device.

21. A method in accordance with claim 18, wherein the stored information includes the orientation of the device.

22. A method in accordance with claim 18, wherein the stored information includes previously measured positions of a projected image from other light sources and the locations of those light sources.

23. A method in accordance with claim 18, wherein the stored information includes previously measured directions to other light sources and the locations of those light sources.

24. A method in accordance with claim 18, further comprising:

measuring the intensity of the collimated beam;

determining the distance from the device to the light source; and storing the distance in the memory, wherein the stored information includes the distance.

25. A method in accordance with claim 18, further comprising displaying the position of the device on a display.

26. A method in accordance with claim 18, further comprising storing the position of the device in the memory.

27. A method in accordance with claim 18, wherein the determining the position of the device from the signal comprises:

selecting a demodulation signal corresponding to a light source;

demodulating the sensor signal with the demodulation signal to obtain a demodulated signal;

determining the position of the collimated beam on the light sensing surface in accordance with the demodulated signal; and retrieving the location of the light source from the memory.

28. A method in accordance with claim 18, wherein the determining the position of the device from the signal comprises:

selecting a light source;

selecting components of the sensor signal in accordance with the spectrum of the light source to obtain a filtered sensor signal;

determining the position of the collimated beam on the light sensing surface in accordance with the filtered sensor signal; and retrieving the location of the light source from the memory.

29. A method in accordance with claim 18, further comprising transmitting the position of the projected image to other devices in a network of devices.

30. A method in accordance with claim 18, further comprising transmitting the direction to a light source to other devices in a network of devices.

31. An object location system comprising:

a first light source located at a first known position; and a detection device for detecting light from the light source and determining the direction to the light source, the device comprising:

a lens for receiving light from the first light source and projecting a light pattern;

a light sensing surface for receiving the light pattern and producing an output signal in response thereto;

one or more additional light sources located at additional known positions;

a processor responsive to the output signal, wherein the processor is operable to determine the position of the detection device from the output signal and the known position of the first light source and wherein the processor is operable to determine the position of the detection device from the output signals due to each of the first and additional light sources and the first and additional known positions of the light sources.

32. An object location system in accordance with claim 31, wherein the lens of the detection device is a pin-hole lens.

33. An object location system in accordance with claim 31, wherein the light sensing surface of the detection device comprises a plurality of light sensing elements.

34. An object location system in accordance with claim 31, wherein the first light source is modulated.

35. An object location system in accordance with claim 31, wherein the first light source and the additional light sources are each modulated by a different modulation pattern.

36. An object location system in accordance with claim 31, wherein the first light source and the additional light sources each emit light with a different spectral character.

37. An object location system in accordance with claim 31, wherein the first light source and the additional light sources each emit light at different times.

38. An object location system in accordance with claim 31, further comprising:

a controller coupled to the first light source and operable to control a characteristic of the first light source.

39. An object location system in accordance with claim 31, wherein the processor determines a distance from the detection device to the first light source according to the intensity of the light falling on the light sensing surface.

40. An object location system in accordance with claim 31, wherein the light source is one of an incandescent bulb, a fluorescent lamp, an LED and a laser diode.

41. An object location system in accordance with claim 31, wherein said detection device further comprises a first transmitter for transmitting the location of the detection device, said system further comprising:

a plurality of sensing devices, each sensing device comprising:

a second transmitter for transmitting signals to other sensing devices;

a receiver for receiving signals from other second transmitters and from the first transmitter; and a processor coupled to the second transmitter and the receiver, wherein each of the plurality of sensing devices is operable to determine its position relative to other sensing devices and relative to the detection device.

42. An object location system in accordance with claim 41, wherein a sensing device of the plurality of sensing devices includes further comprises a sensor for sensing a property selected from the group consisting of temperature, moisture, chemical composition, pressure, motion and light intensity.

43. An object location system in accordance with claim 31, wherein the detection device is incorporated in an object that is to be tracked wherein the detection device further comprises a transmitter for transmitting the location of the detection device.

44. An object location system in accordance with claim 43, further comprising:

a receiver for receiving the location of the detection device transmitted from the transmitter of the detection device.

* * * * *